United States Patent [19]

Ninomiya

[11] Patent Number: 5,140,693
[45] Date of Patent: Aug. 18, 1992

[54] DISPLAY CONFIGURATION SETTING SYSTEM AND METHOD FOR PREFERENTIALLY SETTING EXTENSION DISPLAY CARD

[75] Inventor: Ryozi Ninomiya, Oome, Japan

[73] Assignee: Kabushiki Kaisha Toshiba, Kawasaki, Japan

[21] Appl. No.: 407,478

[22] Filed: Sep. 12, 1989

[30] Foreign Application Priority Data

Sep. 13, 1988 [JP] Japan .................. 63-229021

[51] Int. Cl.⁵ ............................................ G06F 13/00
[52] U.S. Cl. ..................... 395/775; 364/DIG. 2; 364/926.93; 364/927.4; 364/929.4
[58] Field of Search ... 364/200 MS File, 900 MS File; 395/700, 750, 775

[56] References Cited

PUBLICATIONS

Toshiba Personal Computer T5200 Technical Reference Manual, File No. 963-011B, pp. 3-1 to 3-30, Oct. 1988.

IBM Enhanced Graphics Adapter, IBM Personal Computer manual, pp. 1-102, Aug. 2, 1984.

*Primary Examiner*—Thomas M. Heckler
*Attorney, Agent, or Firm*—Finnegan, Henderson Farabow, Garrett and Dunner

[57] ABSTRACT

In a computer system having an extension slot capable of detachably receiving a display adapter board and display hardware controllers for plasma and CRT displays, respectively, the display hardware controllers are disabled in initialization processing upon power-on. Thereafter, it is checked if a certain type of display adapter board is inserted in the extension slot. When the certain type of display adapter board is not inserted, the display control hardware element for the plasma or CRT display is enabled in accordance with display select data selected in setup processing. When the certain type of display adapter board is inserted, the incorporated display hardware controller interfering with the inserted board is disconnected from the system, and the display adapter board inserted in the extension slot is enabled to have a priority over the incorporated controller.

8 Claims, 5 Drawing Sheets

| HRGS (VGA) | EXTENSION CRT ROM (EGA) | SETUP PLASMA DISPLAY ADAPTER | (CONTROL CONTENTS) | | |
|---|---|---|---|---|---|
| | | | HRGS (VGA) | PDC (CGA) | CMOS ERROR |
| ABSENCE | ABSENCE | VGA COMPATIBLE | DISABLE | ENABLE | ERROR |
| | | CGA COMPATIBLE | DISABLE | ENABLE | - |
| | | NOT USED | DISABLE | (NOTE 1) | (NOTE 1) |
| | | ERROR (NOTE 2) | DISABLE | ENABLE | - |
| PRESENCE | ABSENCE | VGA COMPATIBLE | ENABLE | DISABLE | - |
| | | CGA COMPATIBLE | DISABLE | ENABLE | - |
| | | NOT USED | (NOTE 3) | DISABLE | (NOTE 3) |
| | | ERROR (NOTE 2) | ENABLE | DISABLE | - |
| X | PRESENCE | X | DISABLE | DISABLE | - |

X INDICATES DON'T CARE

FIG. 2

[[ System setup ]]

1. Hard disk type = 9 - Cyl = 776, h = 8, s/t = 33, cap = 100MB
2. Memory size
   System memory = 640KB
   Extended memory = 1MB
   Expanded memory = 0MB + 288KB (96KB used as a fast ROM)
3. Display
   Plasma display adapter = VGA compatible
   display device = Plasma
   Plasma display mode = color
   Plasma gray scale = Normal : semi - bright  Intensity : Bright
4. Printer port type = Output port
5. Serial port

DISPLAY CONFIGURATION SETTING SYSTEM AND METHOD FOR PREFERENTIALLY SETTING EXTENSION DISPLAY CARD

BACKGROUND OF THE INVENTION

1. Field of the Invention

The present invention relates to a display configuration setting system suitable for a computer system such as a personal computer or a personal workstation which comprises a plasma display as standard equipment, and can optionally connect a CRT (Cathode Ray Tube).

2. Description of the Related Art

Along with rapid advances of microprocessors, various personal computers, personal workstations, and the like have been developed. Some of these computers have a display configuration in which a plasma display is equipped as standard equipment, and a CRT display can be optionally connected. Such a computer incorporates display hardware controllers respectively for the plasma display and the CRT display. A VGA (Video Graphic Adapter) is a typical CRT display hardware controller.

Furthermore, with recent advances of display control techniques, more advanced display hardware controllers, e.g., an EGA (Enhanced Graphic Adapter), CGA (Color Graphic Adaper), and the like have been developed. In order to allow use of such display hardware controllers, an extension slot is formed in a computer main body, and the EGA or CGA is inserted in the extension slot as an optional display hardware controller board.

However, upon setting of the display configuration, if a certain type of adapter board (e.g., the EGA) is inserted in the extension slot while the display configuration for using the incorporated display hardware controller (e.g., the VGA) is set, two display control hardware elements which interfere with each other are connected on a system bus, and a normal display control operation cannot be executed.

More specifically, each of the VGA and EGA has a video memory. For this reason, two video memories assigned to one address space are present. In the data read mode, a block is read out onto the system bus from each controller video memory, and correct data cannot be obtained.

SUMMARY OF THE INVENTION

It is an object of the present invention to provide a display configuration setting system used in a computer system which incorporates a display control hardware controller for a plasma display and a display hardware controller for a CRT display, and comprises an extension slot capable of receiving an optional board including a display adapter board for extending a function, wherein even if a display adapter board that would interfere with the set display configuration is inserted in the extension slot, a normal display control operation can always be performed.

It is another object of the present invention to provide a display configuration setting method for a computer system which incorporates a display control hardware element for a plasma display and a display control hardware element for a CRT display, and comprises an extension slot capable of receiving an optional board including a display adapter board for extending a function, wherein even if a display adapter board that would interfere with the set display configuration is inserted in the extension slot, a normal display control operation can always be performed.

In order to achieve the above and other objects, according to a first aspect of the present invention, a display configuration setting system, in a computer system having a set of one or more incorporated hardware controllers, and an extension slot capable of detachably receiving a variety of types of extension board, comprises selecting means for selecting one of the set of incorporated hardware controllers, disabling means responsive to an ON operation of a power switch for disabling all incorporated hardware controllers that could interfere with the operation of a certain type of extension board, detecting means for detecting whether the certain type of extension board is inserted in the extension slot, and enabling means, responsive to the detecting means detecting that the certain type of extension board is not inserted in the extension slot, for enabling the hardware controller selected by the selecting means.

According to a second aspect of the present invention, a display configuration setting method, in a computer system having a set of one or more incorporated hardware controllers, and an extension slot capable of detachably receiving a variety of types of extension board, comprises the steps of selecting one of the set of incorporated hardware controllers, disabling in response to an ON operation of a power switch all incorporated hardware controllers that could interfere with the operation of a certain type of extension board, detecting whether the certain type of extension board is inserted in the extension slot, and enabling, when the detecting step detects that the certain type of extension board is not inserted in the extension slot, the hardware controller selected in the selecting step.

According to the present invention, when a certain type of display adapter board is inserted in the extension slot, an incorporated display hardware controller interfering with the inserted board is disconnected from the system, and the display adapter board inserted in the extension slot is enabled to have a priority over other hardware elements. Thus, even if a display adapter board that would interfere with the set display configuration is inserted in the extension slot, a normal display control operation can always be assured.

BRIEF DESCRIPTION OF THE DRAWINGS

Other objects and features of the present invention will be apparent from the following description of an embodiment of the invention taken in connection with the accompanied drawings, in which:

FIG. 2 shows a definition table showing the relationship among states of a high-resolution graphic system and an extension slot, a display configuration set in a setup mode, and operation modes (enable/disable) of the high-resolution graphic system controller (HRGS) and a plasma display graphic system controller (PDC);

FIG. 3 is a view showing a display screen in setup processing; ,and

DETAILED DESCRIPTION OF A PREFERRED EMBODIMENT

Figure 1A:
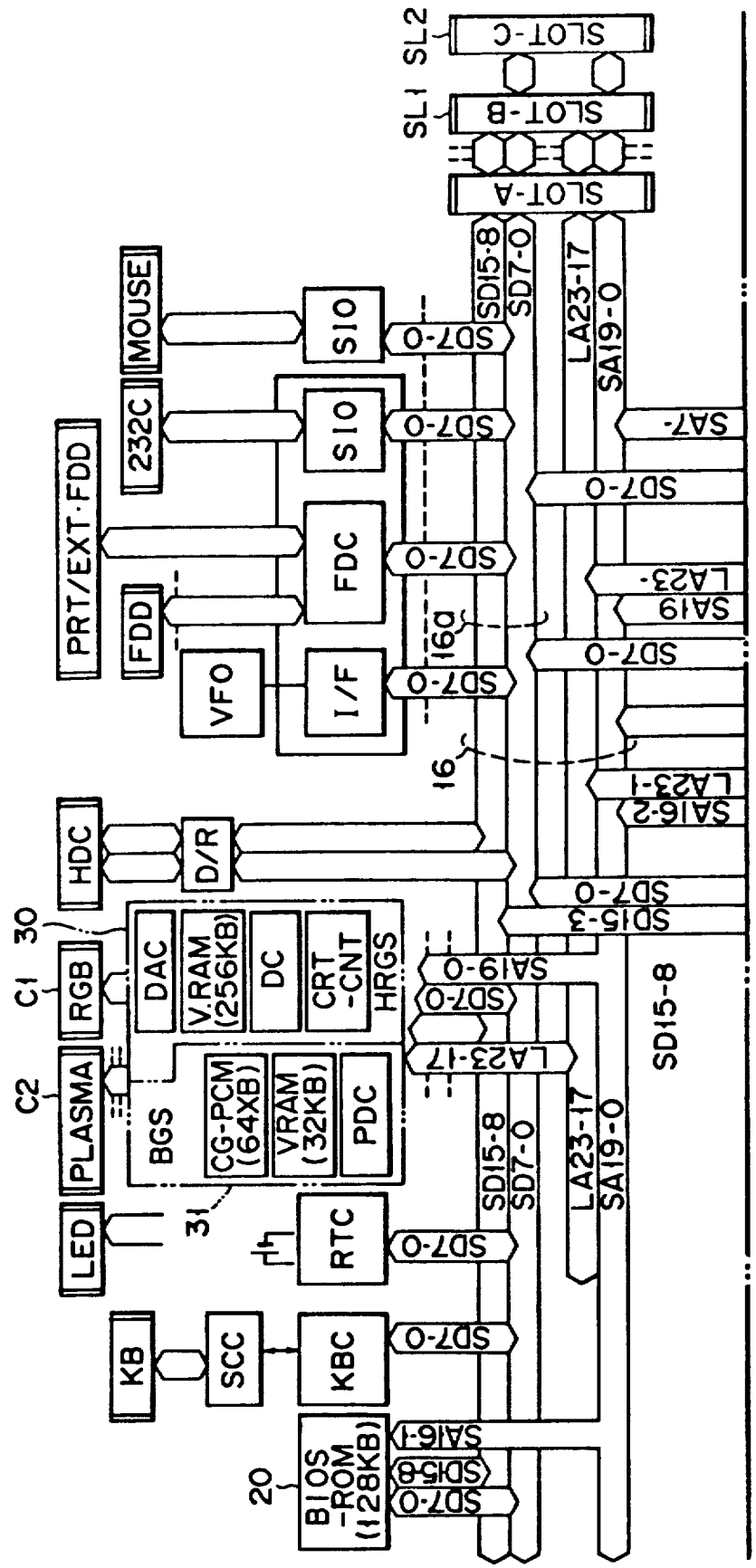
FIGS. 1A and 1B form a block diagram showing an embodiment of a personal computer including a display configuration setting system according to the present invention.
Figure 1B:
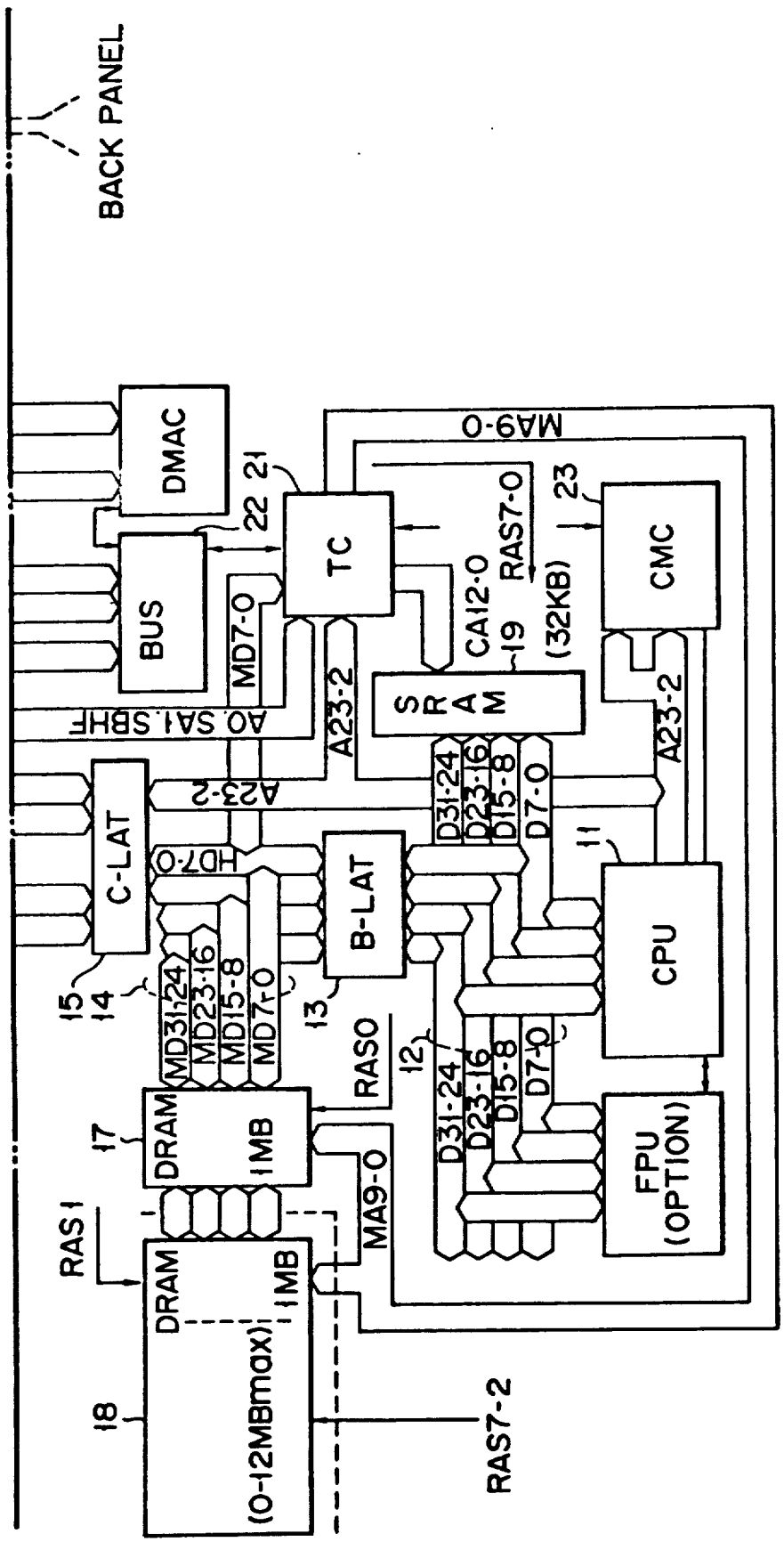
Figure 4:
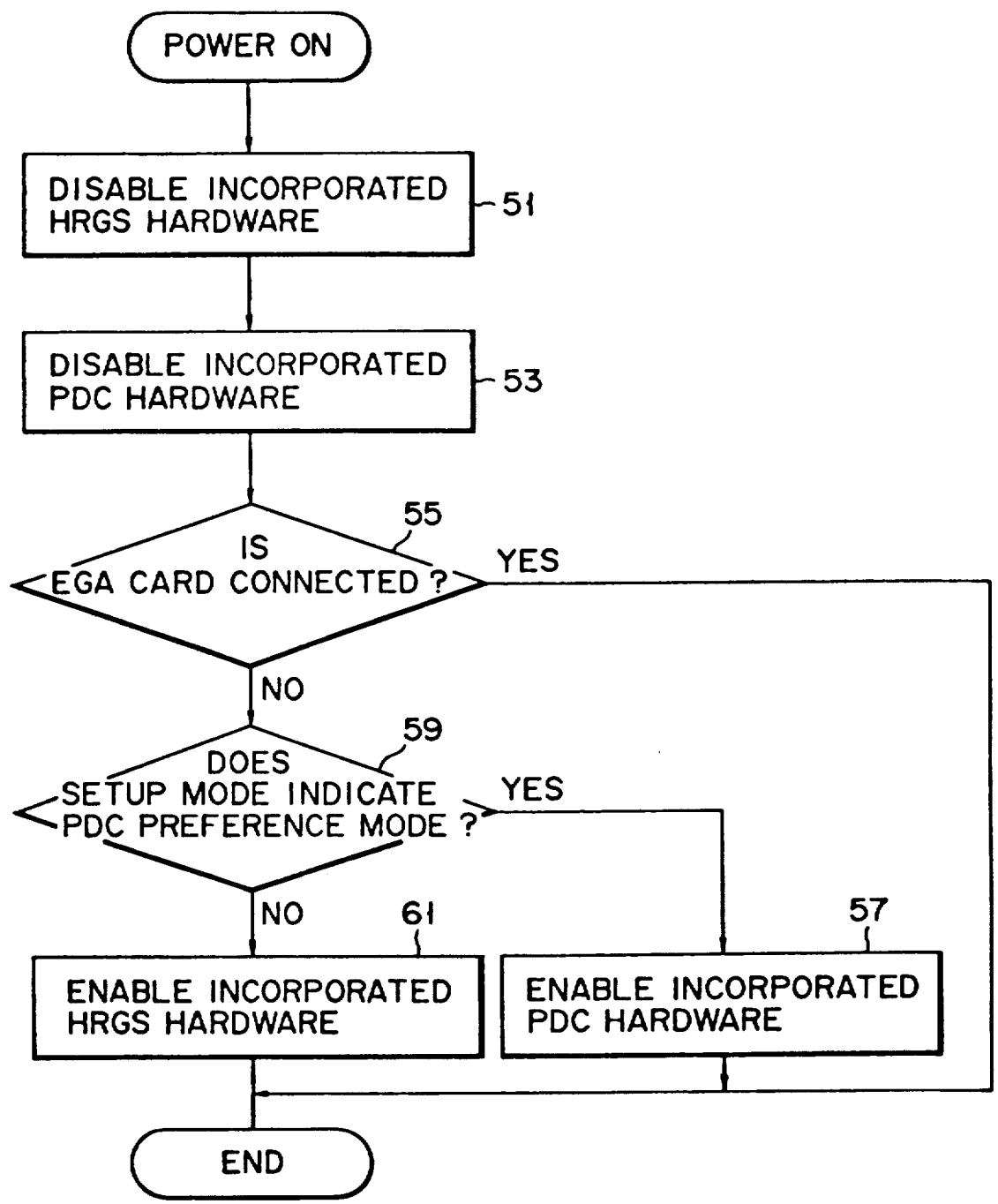
FIG. 4 is a flow chart for explaining an operation of a display configuration setting method o the present invention.

FIGS. 1A and 1B are block diagrams showing an embodiment of a personal computer including a display configuration setting system of an embodiment of the present invention.

In FIGS. 1A and 1B, an element 11 is a CPU (Central Processing Unit) for controlling the entire system. An element 12 is a 32-bit data bus (D31-24, D23-16, D15-8, and D7-0). An element 13 is a latch circuit (B-LAT) for latching data on the data bus 12. An element 14 is a 32-bit memory bus (MD31-24, MD23-16, MD15-8, and MD7-0). An element 16 is a system bus constituted by 20- and 7-bit address buses (SA19-0 and LA23-7) and a 16-bit data bus (SD15-8 and SD7-0) 16a. An element 15 is a latch circuit (C-LAT) for latching address data on the address buses (SA19-0 and LA23-17) and data on the data bus (SD15-8 and SD7-0) 16a. Elements 17 and 18 are respectively internal battery-backup RAMs comprising DRAMs (dynamic random access memories). Element 20 is an internal ROM (BIOS-ROM) for storing a BIOS (basic input and output system program).

An element 21 is a timing controller (TC) for controlling timings of the entire system including memory control. An element 22 is a bus controller (BUS-CNT) for controlling the system bus 16. An element 23 is a cache memory controller (CMC) for controlling the cache memory 19.

An element 30 contains a high-resolution graphic system controller (HRGS) having a display control function for driving a CRT display at a high resolution (720 dots in a horizontal direction) and in multi-gray scale levels (64 gray scale levels) and a display control function for simultaneously driving the CRT display and a plasma display (in this case, both the displays have a display resolution of 640 dots in the horizontal direction), and has a structure optionally connected to an apparatus main body. The CRT display is optionally connected through a connector C1. An element 31 contains a graphic system controller (PDC) for driving a plasma display. The plasma display is connected through a connector C2. Note that the plasma display is standard equipment, and is kept connected through the connector C2.

Elements SL1 and SL2 are extension slots (SLOT-B and SLOT-C) capable of connecting various extension boards including a display adapter board.

FIG. 2 shows a definition table showing the relationship among the states of the HRGS 30 and the extension slot SL1 (or SL2), a display configuration set in a setup mode, and the operation modes (enable/disable) of the HRGS 30 and the BGS 31.

In the definition table shown in FIG. 2, setup data is stored in the backup memories (internal RAMs 17 and 18). The definition table includes data indicating whether or not a VGA (high resolution graphic system) is connected, data indicating whether or not an EGA (extension CRT ROM) is connected, setup data designated by a user (stored in the backup memories), and data representing control contents. When the HRGS (VGA) is not connected, if a user designates a VGA compatible mode, the HRGS is disabled, a PDC (plasma display controller) is enabled, and a setup memory error (an error indicating a designation error of a user) is displayed. The PDC is enabled since a message cannot be displayed if the PDC is also disabled. When the VGA is not connected, if a user designates a CGA compatible mode, the HRGS is disabled and the PDC is enabled. In this embodiment, the PDC is essentially the same as the CGA, and in this case, no error display is made.

When the VGA is not connected, if a user designates a "not used" mode (no incorporated card is used, i.e., neither the VGA nor CGA are used), the system checks if another adapter card (e.g., EGA) is used besides the VGA or CGA, and if not used, displays a setup memory error. Note that in the table shown in FIG. 2, "NOTE 1" indicates that if a display adapter card having an extension ROM is connected in place of an EGA card, the same processing as for when the EGA card is present is performed. "ERROR (NOTE 2)" indicates that the content of the backup memory storing the setup data is not correct. For example, when this system is configured, data is stored in the backup memory, and the "NOTE 2" indicates such a state. "NOTE 3" of the HRGS indicates that the HRGS is disabled if another card is inserted in the extension slot in place of the EGA card, but if not inserted, the HRGS is enabled. Similarly, "NOTE 3" of the setup memory error indicates that if another card is inserted in the extension slot, an error is not determined, but if not inserted, an error is determined.

In this embodiment, the system incorporates the VGA, which can be detached by a user. Therefore, "absence" in the definition table in FIG. 2 means that the VGA is physically detached.

In order to disable or enable the system, for example, in the block diagram shown in FIGS. 1A and 1B, if the CPU 11 outputs "1" data to a CRT controller (CRT-CNT) in the HRGS, the HRGS is enabled; and if it outputs "0" data, the HRGS is disabled. The CRT controller receives the "1" or "0" data output from the CPU 11, and writes it in an internal register (not shown).

FIG. 3 shows a display screen in setup processing.

As shown in FIG. 3, in setup processing, the type of hard disk, memory sizes (of a system memory, extended memory, and expanded memory), a display device (designation of the plasma display adapter, display device, plasma display mode, and plasma display gray scale), a printer port type, and the like are designated.

The disabling and enabling operation of the embodiment of the present invention will be described below with reference to FIGS. 1A through 4.

The invention includes a selecting means for selecting from a set of one or more incorporated display controllers. As embodied herein, the selecting means includes memories 17 and 18, containing user designated setup data that is written to the memories during a set processing operation.

The invention also includes a disabling means for disabling one or more incorporated display controllers. As embodied herein, the disabling means includes the CPU 11 and a powerup procedure that writs to a register on the HRGS 30 and a register on the BGS 31.

The invention further includes an enabling means for enabling, when the detecting means detects that a certain type of extension board is not inserted in the extension slot, the display controller board selected by the selecting means. As embodied herein, the enabling means includes the CPU 11 and a powerup procedure that writes to either an internal register on the HRGS 30 or an internal register on the BGS 31, depending on the state of the memories 17 and 18 and on whether the VGA is present.

When a power switch is turned on, the CPU 11 disables the incorporated HRGS hardware element (high-resolution graphic system 30) in step 51, and disables the incorporated PDC hardware element (graphic system 31) in step 53. In step 55, the CPU 11 checks if a specific display adapter board (in this case, EGA) is connected to the extension slot SL1 or SL2.

If YES in step 55, the CPU 11 enables display drive of the specific display adapter board while allowing the HRGS 30 and the BGS 31 to remain disabled.

However, if NO in step 55, the CPU 11 recognizes a display configuration state set in the setup processing in step 59. That is, if it is determined in step 59 that a plasma display mode (PDC preference mode) is selected, the CPU 11 enables the BGS 31 in step 57.

If it is determined in step 59 that a CRT display mode (HRGS preference mode) is set, the CPU 11 enables the HRGS 30 in step 61, provided that the HRGS 30 is present.

If it is determined in step 55 that not the EGA board but another extension board (a board which does not interfere with the HRGS 30 and the BGS 31) is connected to the extension slot SL1 or SL2, the CPU 11 performs the processing that recognize the incorporated boards.

The invention described above allows the user to insert a display control board into an extension slot, even when the board would interfere with the with the board selection designated by the user in setup processing. The presence of an interfering board overrides the board selection designated by the user. Thus, the problems of the prior art are avoided, wherein the user was forced to perform an additional setup processing, before he could operate the system with the inserted board.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. A display configuration setting system, in a computer system having a plurality of different hardware controllers therein, and an extension slot capable of detachably receiving a variety of types of extension boards, comprising:
    selecting means for selecting one of the plurality of hardware controllers;
    disabling means responsive to an ON operation of a power switch for disabling all the hardware controllers;
    detecting means for detecting whether a certain type of extension board is inserted in the extension slot; and
    enabling means, responsive to the detecting means, for enabling the hardware controller selected by the selecting means when the certain type of extension board is not inserted in the extension slot.

2. A system as recited in claim 1, wherein the selecting means further includes a memory for storing hardware preference data designated by a user, the disabling means further includes a CPU and a power up procedure stored in the memory for disabling the hardware controllers by writing disable data to registers on the hardware controllers, and the detecting means further includes the CPU and a procedure stored in the memory for detecting whether the certain type of extension board is inserted in the extension slot, and the enabling means further includes the CPU and another procedure stored in the memory for enabling the selected hardware controller by writing enable data to a register on the hardware controller.

3. A system as recited in claim 1 or 2, wherein the plurality of hardware controllers includes a plasma display hardware controller and a detachably connected CRT display hardware controller, the selecting means selects one of the plasma display hardware controller and the detachably connected CRT display hardware controller, the disabling means disables both the plasma display hardware controller and the detachably connected CRT display hardware controller, and the detecting means operates when the plasma display hardware controller and the CRT display hardware controller are disabled by the disabling means.

4. A system as recited in claim 3, wherein the selecting means is responsive to the presence of the CRT display hardware controller and is responsive to whether an extension board other than the certain type is inserted in the extension slot.

5. A display configuration setting method, in a computer system having a plurality of different hardware controllers therein, and an extension slot capable of detachably receiving a variety of types of extension boards, comprising the steps of:
    selecting one of the plurality of hardware controllers;
    disabling in response to an ON operation of a power switch all the hardware controllers;
    detecting whether a certain type of extension board is inserted in the extension slot; and
    enabling, responsive to the detecting step, the hardware controller selected in the selecting step when the certain type of extension board is not inserted in the extension slot.

6. A method as recited in claim 5, wherein the selecting step is responsive to hardware preference data stored in a memory and designated by a user, the disabling step is performed by a CPU and a power up procedure stored in the memory for disabling the hardware controllers by writing disable data to registers on the hardware controllers, the detecting step is performed by the CPU executing a procedure stored in the memory for detecting whether the certain type of extension board is inserted in the extension slot, and the enabling step is performed by the CPU executing another procedure stored in the memory for enabling the selected hardware controller by writing the enable data to a register on the hardware controller when the certain type of extension board is inserted in the extension slot.

7. A method as recited in claim 5 or 6, wherein the selecting step selects one of a plasma display hardware controller and a detachably connected CRT display hardware controller, the disabling step disables both the plasma display hardware controller and the detachably connected CRT display hardware controller, and the detecting step is performed when the plasma display hardware controller and the CRT display hardware controller are disabled in the disabling step.

8. A method as recited in claim 7, wherein the selecting step is responsive to the presence of the CRT display hardware controller and is responsive to whether an extension board other than the certain type is inserted in the extension slot.

* * * * *

UNITED STATES PATENT AND TRADEMARK OFFICE
CERTIFICATE OF CORRECTION

PATENT NO. : 5,140,693
DATED : August 18, 1992
INVENTOR(S) : Ryozi Minomiya It is certified that error appears in the above-identified patent and that said Letters Patent is hereby corrected as shown below:

On the Title page, item [57]
Abstract, line 9, change "display control hardware element" to --display hardware controller--.

Signed and Sealed this

Ninth Day of November, 1993

Attest:

BRUCE LEHMAN

*Attesting Officer*  *Commissioner of Patents and Trademarks*